US009262059B2

(12) United States Patent
Kim et al.

(10) Patent No.: US 9,262,059 B2
(45) Date of Patent: Feb. 16, 2016

(54) OPTIMIZATION OF APPLICATION EXECUTION BASED ON LENGTH OF PULLED OUT FLEXIBLE DISPLAY SCREEN

(71) Applicant: LG ELECTRONICS INC., Seoul (KR)

(72) Inventors: Jihwan Kim, Seoul (KR); Jihyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 39 days.

(21) Appl. No.: 13/912,019

(22) Filed: Jun. 6, 2013

(65) Prior Publication Data

US 2013/0275910 A1 Oct. 17, 2013

Related U.S. Application Data

(63) Continuation of application No. PCT/KR2012/002216, filed on Mar. 27, 2012.

(51) Int. Cl.

*G06F 3/00* (2006.01)
*G06F 3/0484* (2013.01)
*G06F 1/16* (2006.01)
*G06F 3/0481* (2013.01)

(52) U.S. Cl.

CPC ............ *G06F 3/0484* (2013.01); *G06F 1/1647* (2013.01); *G06F 1/1652* (2013.01); *G06F 3/0481* (2013.01); *G06F 2203/04102* (2013.01)

(58) Field of Classification Search

CPC ....................................... G06F 3/0481–3/0484
USPC .......................................................... 715/800
See application file for complete search history.

(56) References Cited

U.S. PATENT DOCUMENTS 6,311,076 B1 * 10/2001 Peuhu et al. .................. 455/566
6,771,232 B2 * 8/2004 Fujieda et al. .................. 345/30
6,919,864 B1 * 7/2005 Macor ............................ 345/1.1
7,558,057 B1 * 7/2009 Naksen et al. ........... 361/679.56
7,667,962 B2 * 2/2010 Mullen .................... 361/679.56
7,782,274 B2 * 8/2010 Manning ........................ 345/1.3
8,289,687 B2 * 10/2012 Weinstein et al. ......... 361/679.3
2003/0048256 A1 * 3/2003 Salmon ......................... 345/168
2003/0071800 A1 * 4/2003 Vincent et al. ................ 345/204
2003/0071832 A1 * 4/2003 Branson ........................ 345/698
2005/0015772 A1 * 1/2005 Saare et al. ................... 719/310
2008/0263024 A1 * 10/2008 Landschaft et al. .............. 707/5
2009/0051830 A1 * 2/2009 Matsushita et al. ........... 348/836
2010/0064244 A1 * 3/2010 Kilpatrick et al. ............ 715/773
2010/0117975 A1 * 5/2010 Cho ............................. 345/173

(Continued)

FOREIGN PATENT DOCUMENTS

KR 10-2006-0022080 A 3/2006
KR 10-2010-0027502 A 3/2010
KR 10-2010-0052227 A 5/2010

*Primary Examiner* — Steven B Theriault

(74) *Attorney, Agent, or Firm* — Birch, Stewart, Kolasch & Birch, LLP

(57) ABSTRACT

A display device that incorporates a supplemental flexible display that is stored within a main body of the display device is presented that is able to optimize the operation of the display device by controlling an application that is displayed on the supplemental flexible display. The display device is optimized by relating certain applications as being optimized to be displayed for certain display sizes, where the display size is determined by a pulled out length of the supplemental flexible display. This is done because a display size may have a significant impact on the effectiveness of certain applications.

16 Claims, 15 Drawing Sheets

Display Device
100

160
170
Applications that are Optimized for the Current Flexible Display Length
103
A1 A2 A3
i-1 i-2 i-3
L1
104a 104b 104c

(56) References Cited

U.S. PATENT DOCUMENTS

2010/0167791 A1* 7/2010 Lim .............................. 455/566
2010/0293502 A1* 11/2010 Kang et al. .................... 715/803
2011/0043479 A1* 2/2011 van Aerle et al. ............. 345/174
2011/0175930 A1* 7/2011 Hwang et al. ................. 345/629
2013/0127918 A1* 5/2013 Kang et al. .................... 345/660
2013/0201208 A1* 8/2013 Cho et al. ...................... 345/619
2013/0321340 A1* 12/2013 Seo et al. ...................... 345/174
2014/0089833 A1* 3/2014 Hwang et al. ................. 715/769

* cited by examiner

Fig. 3a

| Display Size of a Display Area on a Flexible Display | Designated Application |
| --- | --- |
| First Size | First Application |
| Second Size | Second Application |
| Third Size | Third Application |
| . . . | . . . |

Fig. 3b

| Display Size of a Display Area on a Flexible Display | Most Frequent Application |
| --- | --- |
| First Size | First Application |
| Second Size | Second Application |
| Third Size | Third Application |
| . . . | . . . |

Fig. 4c
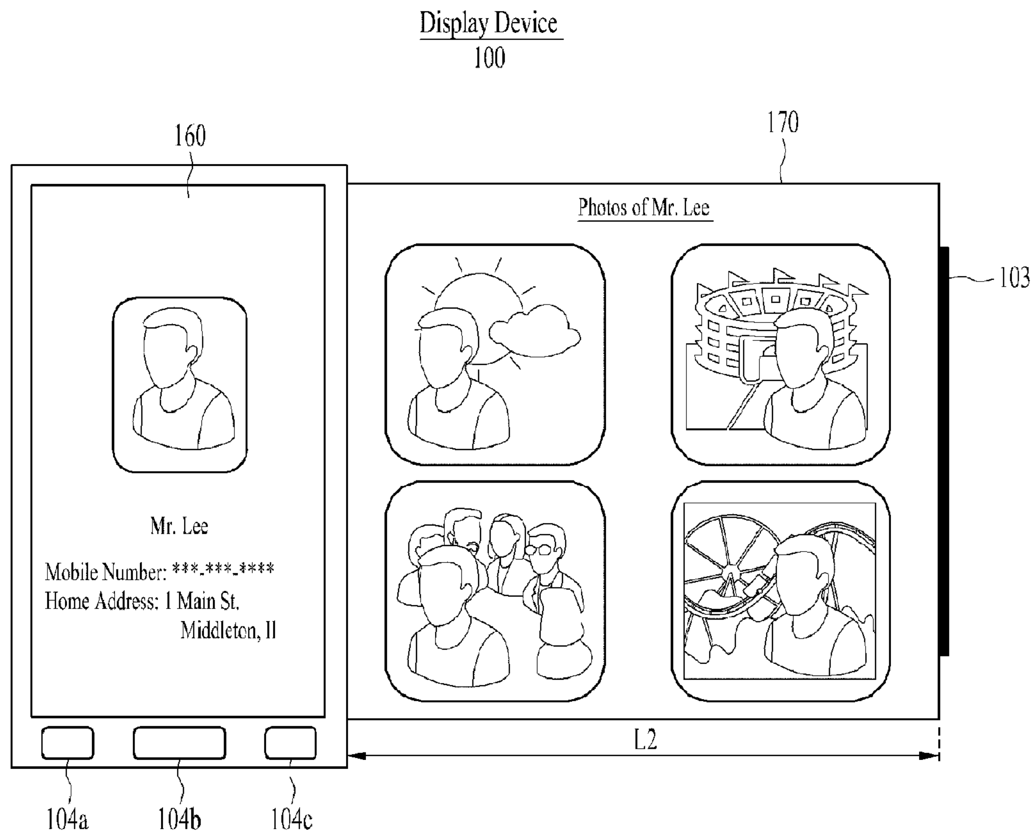
[Fig. 4d]
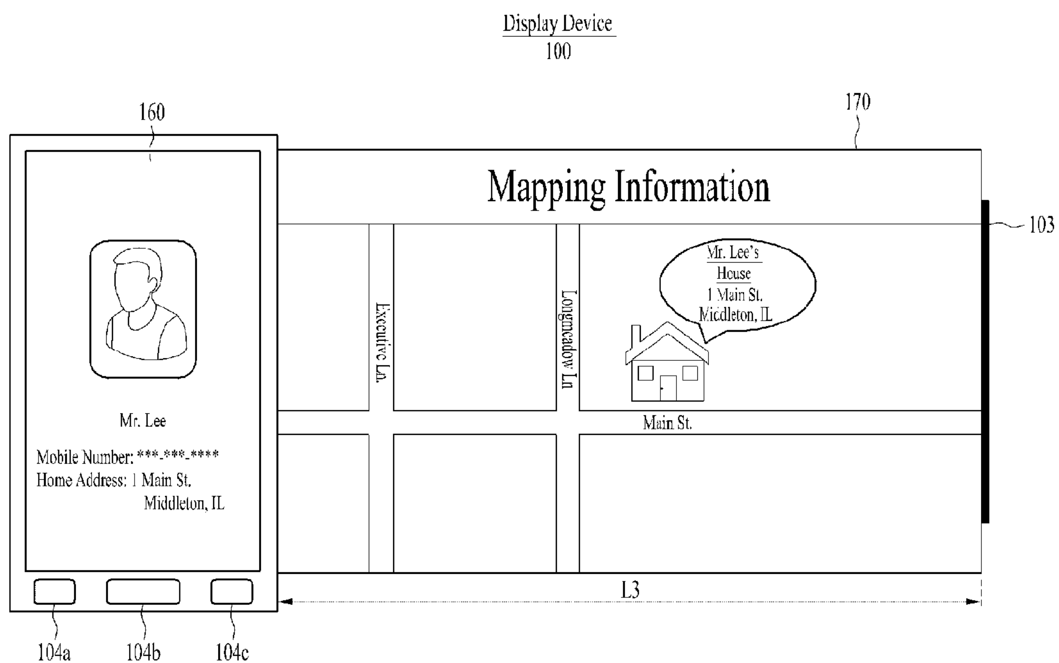

Fig. 5a

| Display Size of a Display Area on a Flexible Display | Designated Application for Main Application A | Designated Application for Main Application B |
|---|---|---|
| First Size | First Application | ... |
| Second Size | Second Application | ... |
| Third Size | Third Application | ... |
| . . . | . . . | . . . |

Fig. 5b

| Display Size of a Display Area on a Flexible Display | Most Frequent Application for Main Application A | Most Frequent Application for Main Application B |
|---|---|---|
| First Size | First Application | ... |
| Second Size | Second Application | ... |
| Third Size | Third Application | ... |
| . . . | | |

Display Device
100
Applications that are Optimized for the Current Flexible Display Length
170
103
A1
A2
A3
A4
A5
A6
A7
A8
A9
i-1
i-2
i-3
i-4
i-5
i-6
i-7
i-8
i-9
L3
160
104a
104b
104c

OPTIMIZATION OF APPLICATION EXECUTION BASED ON LENGTH OF PULLED OUT FLEXIBLE DISPLAY SCREEN

TECHNICAL FIELD

The present disclosure is written to describe the present invention that is related to a display device that employs an extendable flexible display screen.

BACKGROUND ART

Portable display devices have come to play an important role in many people's lives. To emphasize the portability of these display devices, the trend has been to make new portable display devices smaller in size. The obvious trade off for making smaller portable display devices that are easier to carry around is that the display screen size is sacrificed. Consumers are then left with the choice of sacrificing portability for a larger screen size, or sacrificing screen size for increased portability.

However the use of various types of flexible display screens have been introduced for use on portable display devices where the shape of the display screen is able to be deformed. These flexible display screens allow a user to enjoy the benefits of portability without the sacrifice in display screen size. One such example is a portable display device that employs a rollable type flexible display screen.

Now with a flexible display screen, a user is able to adjust a size of a viewing screen by adjusting the length of the flexible display screen that is exposed. It follows that certain applications and programs may be optimized to run for certain viewing screen sizes.

DISCLOSURE OF INVENTION

Technical Problem

With the availability of the extendable flexible display, a display device is made available with a number of unique viewing screen sizes. So a display device that employs an extendable flexible display is no longer limited to the single display screen that is set at the front side of the display device.

Yet with the advantage of multiple viewing screen sizes due to the flexible display, a unique issues arises as to determining which applications and programs are optimized to run and be displayed for each viewing screen size of the flexible display.

Each viewing screen size that is made available for a given flexible display screen length that is extended out from a display device, may result in a situation where certain applications or programs are optimized to be displayed on the flexible display. For instance for a given length of the flexible display that is extended out may result in a viewing screen size having a given resolution. Or perhaps for a given length of the flexible display that is extended out a user is found to have executed a certain application more often than others, according to past usage history information.

In any case, there is a need to provide a method and apparatus that is capable of determining a proper application/program to execute and display on a display area of a flexible display, depending on the size of the display area on the flexibile display.

Solution to Problem

Accordingly, the present invention is directed to a display device that is able to provide a user with an optimal viewing experience based on the length of a pulled out flexible display screen.

To achieve this and other objectives, the present invention is directed to a method of controlling an application that is displayed on a flexible display of a display device, the method comprising: exposing the flexible display from a stored location; measuring a length of the flexible display that is exposed; setting a display size of a display area on the flexible display based on the measured length of the flexible display, and executing a first application and displaying the first application on the flexible display when the display size of the display area is set to a first size.

Preferably, the method further comprises: storing, in a storage unit, a first list of applications that are designated to be executed and displayed on the flexible display when the display size of the display area is the first size, wherein the first application is included in the first list.

Preferably, the method further comprises: recording, in a storage unit, history information identifying the frequency with which applications are executed and displayed on the flexible display when the display size of the display area is set to the first size, and referencing the history information, and executing and displaying an application on the flexible display that has been executed and displayed on the flexible display with the highest frequency when the display size of the display area is the first size, wherein the first application is the application that has been executed and displayed on the flexible display with the highest frequency when the display size of the display area is the first size.

Preferably, the method further comprises displaying at least one identifier identifying an application that is designated to be executed and displayed on the flexible display when the display size of the display area is set to the first size; and selecting the identifier, wherein the selected identifier identifies the first application.

Preferably, the method further comprises: executing and displaying a main application on a main display of the display device; wherein the first application that is executed and displayed on the flexible display when the display size of the display area is set to the first size, is an application that supplements the main application.

More preferably, the main application provides profile information of a person on a contact list stored in a storage unit, and the first application displays additional information on the person on the contact list.

Preferably, the method further comprises: continuing to expose the flexible display from the stored location; setting a display size of a display area on the flexible display based on the measured length of the flexible display, and executing a second application and displaying the second application on the flexible display when the display size of the display area is set to a second size.

Preferably, the method further comprises: returning the flexible display into the stored location; measuring a length of the flexible display that is exposed; setting a display size of a display area on the flexible display based on the measured length of the flexible display, and executing the first application and displaying the first application on the flexible display when the display size of the display area is set back to the first size.

More preferably, the second application is one of a music playing application, a remote control application, mapping application, a web browsing application, a book reading application and a video player application.

More preferably, the method further comprises: continuing to expose the flexible display from the stored location; setting a display size of a display area on the flexible display based on the measured length of the flexible display, and executing a third application and displaying the third application on the flexible display when the display size of the display area is set to a third size.

To further achieve the objectives of the present invention, the present invention is further directed to a display device, the display device comprising: a flexible display configured to be exposed from a stored location; a measuring unit configured to measure a length of the flexible display that is exposed, and a system controller configured to set a display size of a display area on the flexible display based on the measured length of the flexible display, and execute a first application and control a display of the first application on the flexible display when the display size of the display area is set to a first size.

Preferably, the display device further comprises: a storage unit configured to store a first list of applications that are designated to be executed and displayed on the flexible display when the display size of the display area is the first size, wherein the first application is included in the first list.

Preferably, the display device further comprises: a storage unit configured to record history information identifying the frequency with which applications are executed and displayed on the flexible display when the display size of the display area is set to the first size, and the system controller is further configured to reference the history information, and execute and control the display of an application on the flexible display that has been executed and displayed on the flexible display with the highest frequency when the display size of the display area is the first size, wherein the first application is the application that has been executed and displayed on the flexible display with the highest frequency when the display size of the display area is the first size.

Preferably, the flexible display is further configured to display at least one identifier identifying an application that is designated to be executed and displayed on the flexible display when the display size of the display area is set to the first size; and the system controller is further configured to recognize a selection of the identifier displayed on the flexible display, wherein the selected identifier identifies the first application.

Preferably, the display device further comprises: a main display, wherein the system controller is further configured to execute and control a display of a main application on the main display; wherein the first application that is executed and displayed on the flexible display when the display size of the display area is set to the first size, is an application that supplements the main application.

More preferably, the main application provides profile information of a person on a contact list stored in a storage unit, and the first application displays additional information on the person on the contact list.

Preferably, the system controller is further configured to execute and control a display of a second application on the flexible display when the display size of the display area is set to a second size.

Preferably, the system controller is further configured to execute and control the display of the first application on the flexible display when the display size of the display area is set back to the first size.

More preferably, the second application is one of a music playing application, a remote control application mapping application, a web browsing application, a book reading application and a video player application.

More preferably, the system controller is further configured to execute and control a display of a third application on the flexible display when the display size of the display area is set to the third size.

Advantageous Effects of Invention

Therefore the present invention is able to provide a method and apparatus capable of determining a proper application/program to execute and display on a display area of a flexible display, depending on the size of the display area on the flexibile display.

BRIEF DESCRIPTION OF DRAWINGS

FIG. 3A illustrates a table describing a designated application to be executed and displayed on a flexible display based on a display size of a display area on the flexible display, according to some embodiments of the present invention;

FIG. 3B illustrates a table mapping a most frequently executed and displayed application for each available display size of a display area on the flexible display, according to some embodiments of the present invention;

FIG. 4C illustrates a main application being displayed on a main display and a second supplemental application being displayed on a flexible display of a display device, according to some embodiments of the present invention;

FIG. 4D illustrates a main application being displayed on a main display and a third supplemental application being displayed on a flexible display of a display device, according to some embodiments of the present invention;

FIG. 5A illustrates a table describing a designated application to be executed and displayed on a flexible display based on a main application being displayed on a main display and a display size of a display area on the flexible display, according to some embodiments of the present invention;

FIG. 5B illustrates a table mapping a most frequently executed and displayed application for a given main application being displayed on a main display and for each available display size of a display area on the flexible display, according to some embodiments of the present invention;

MODE FOR THE INVENTION

Reference will now be made in detail to exemplary embodiments of the present invention, examples of which are illustrated in the accompanying drawings. It will be apparent to one of ordinary skill in the art that in certain instances of the following description, the present invention is described without the specific details of conventional details in order to avoid unnecessarily distracting from the present invention. Wherever possible, like reference designations will be used throughout the drawings to refer to the same or similar parts. All mention of a display device is to be understood as being made to a display device of the present invention unless specifically explained otherwise.

It should also be understood that, although the terms first, second, etc. may be used throughout the following description to describe various elements of the present invention, these elements should not be limited to these terms. The numerical ordering terms first, second, etc. are used to represent relevant ordering of the various elements and should be understood as such.

Figure 1:
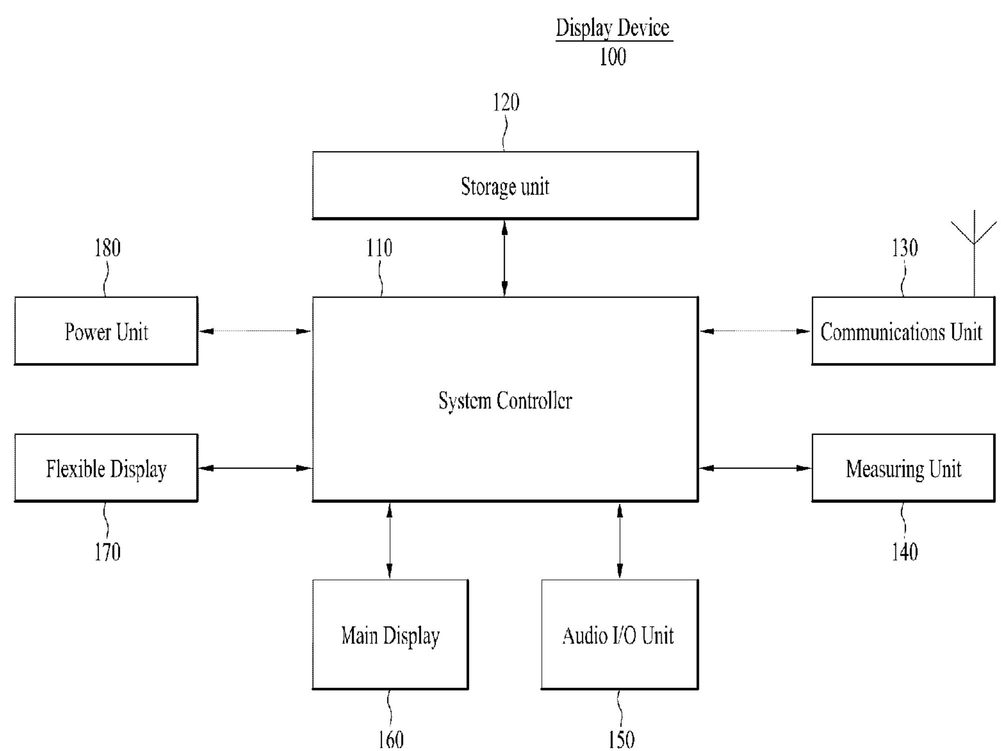
FIG. 1 illustrates a block diagram describing the architecture of a display device, according to the present invention.

FIG. 1 illustrates a general architecture block diagram for a display device 100 according to some embodiments of the present invention. It should be appreciated that it is within the scope of the present invention to encompass display devices that may include a fewer, or greater, number of components than what is expressly illustrated in FIG. 1. The display device 100 illustrated in FIG. 1 may, for example, be a mobile telecommunications device, notebook computer, tablet computing device, portable navigation device, portable video player, personal digital assistant (PDA) or other similar display device.

As illustrated in FIG. 1, the display device 100 includes a system controller 110, a storage unit 120, a communications unit 130, a measuring unit 140, an audio input/output (I/O) unit 150, a main display unit 160, a power unit 170 and a flexible display unit 180.

Although not specifically illustrated in FIG. 1, components of the display device 100 are able to communicate with each other via one or more communication buses or signal lines. It should also be appreciated that the components of the display device 100 may be implemented as hardware, software, or a combination of both hardware and software (e.g. middleware).

The storage unit 120 illustrated in FIG. 1 may include non-volatile type memory such as non-volatile random-access memory (NVRAM) or electrically erasable programmable read-only memory (EEPROM), commonly referred to as flash memory. The storage unit 120 may also include other forms of high speed random access memory such as dynamic random-access memory (DRAM) and static random-access memory (SRAM), or may include a magnetic hard disk drive (HDD). In cases where the flexible display device is a mobile communication device, the storage unit 120 may additionally include a subscriber identity module (SIM) card for storing a user's profile information.

The storage unit 120 is tasked with storing various data, instructions and applications that are needed to operate the display device and provide a user with a gratifying user experience. As will be described in more detail throughout this description, the display device 100 of the present invention employs a touch sensitive main display and a touch sensitive flexible display.

Individual applications may be stored on the storage unit 120 as embodied by a set of specific instructions to be executed by the system controller 110 in order to run applications on the display device 100. Some examples of applications that may be stored on the storage unit 120 include e-mail applications, video viewing applications, audio playing applications, web browsing applications, and gaming applications.

In some embodiments of the present invention, the storage unit 120 may further include access to remote storage in a cloud storage computing environment. The remote storage may be accessed via the communications unit 130.

The communications unit 130, as illustrated in FIG. 1, may include RF circuitry that allows for wireless access to outside communications networks such as the Internet, Local Area Networks (LANs), Wide Area Networks (WANs) and the like. The wireless communications networks accessed by the communications unit 130 may follow various communications standards and protocols including, but not limited to, Global System for Mobile Communications (GSM), Enhanced Data GSM Environment (EDGE), code division multiple access (CDMA), wideband code division multiple access (W-CDMA), time division multiple access (TDMA), Bluetooth, Wireless Fidelity (Wi-Fi), Short Message Service (SMS) text messaging and any other relevant communications standard or protocol that allows for wireless communication by the display device 100. In some embodiments of the present invention, the communications unit 130 may also include a tuner for allowing for the reception of broadcast signals according to, for example, the digital multimedia broadcasting (DMB), digital video broadcasting technologies, advanced television systems committee (ATSC), integrated services digital broadcasting (ISDB) or digital terrestrial multimedia broadcast (DTMB) standards.

Additionally, the communications unit 130 may include various input and output interfaces (not expressly illustrated) for allowing wired data transfer communication between the display device 100 and an external electronics device. These interfaces may include, for example, interfaces that allow for data transfers according to the family of universal serial bus (USB) standards, the family of IEEE 1394 standards or other similar standards that relate to data transfer.

The measuring unit 140 illustrated in FIG. 1 is comprised of circuitry that allows the measuring unit 140 to measure a length of a flexible display 180 that is pulled out from storage location within the display device 100. The inner storage location that stores the flexible display 180 may be constructed as a separate housing unit from the main body of the display device 100, or in some embodiments the inner storage location may simply be incorporated into the main body of the display device 100. When a portion of the flexible display 180 is pulled out from the inner storage location, the pulled out portion of the flexible display 180 will have been exposed for viewing. The measuring unit 140 is then able to detect a length of the flexible display 180 that has been exposed for viewing. In some embodiments, the measuring unit 140 may also measure a length of a portion of the flexible display 180 that still remains within the inner storage location.

The audio I/O unit 150 illustrated in FIG. 1 may include a speaker or headphone interface for outputting audio signals originating from the storage unit 120 of the display device 100. The audio I/O unit 150 may also include a microphone for inputting audio signals into the display device 100.

The main display 160 is preferably a touch sensitive display screen that incorporates a display screen and touch input recognition sensors. Thus the main display 160 of the display device 100 may be considered to be a touch sensitive display, capable of detecting touch input contacts on its surface. In this way, the main display 160 is able to provide an input and output UI for a user of the display device 100 to input commands and control objects displayed on the main display 160.

The main display 160 may be a display screen that is implemented according to liquid crystal display (LCD) technology that allows for a thin display screen and touch sensitive capabilities. The main display 160 may also be a display screen that is implemented according to other similar display technologies such as organic light emitting diode (OLED) display technology, electroluminescent display (ELD) technology or electronic paper technology.

The flexible display 170 illustrated in FIG. 1 is a supplemental display to the main display 160. Whereas the main display 160 is exposed for viewing at all times, the flexible display 170 may be stored within an inner storage location as described briefly above. Like the main display 160, however, preferably the flexible display 170 is also a touch sensitive display screen that incorporates a flexible display screen and touch input recognition sensors. Therefore, like the main display 160, a user's touch input contact on the flexible display 170 may be detected.

The flexible display 170 itself may be implemented according to liquid crystal diode (LCD) technology or other similar display technology such as organic light emitting diode (OLED) display technology, electroluminescent display (ELD) technology or electronic paper technology that allows for a high degree of flexibility. Because the flexible display 170 is able to be physically deformed, the flexible display 170 may be stored in an inner storage location which has the benefit of not adding to the overall size of the display device 100 when the flexible display 170 is stored within the storage location.

According to the present invention, a user's multi-touch contacts on either one of the main display 160 and flexible display 170 may be detected and recognized.

The power unit 180 illustrated in FIG. 1 is a power source for providing the power to operate the various components/units of the flexible display device 100. The power unit 180 may include a battery or an interface for providing power from external power sources (e.g. direct current adaptor, alternating current adaptor).

Figure 2A:
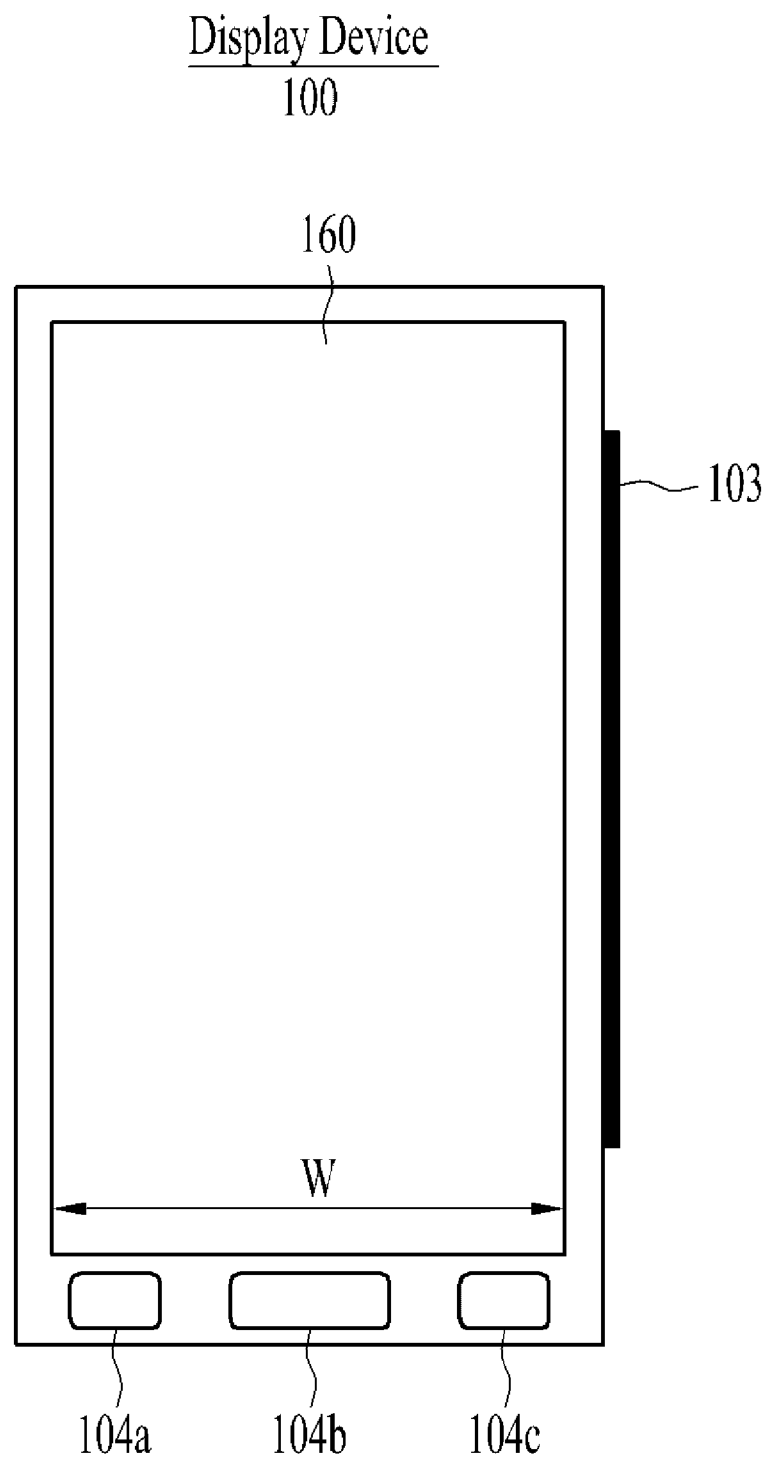
FIG. 2A illustrates an external view of a display device, according to the present invention.

FIGS. 2A-2D provides an external view of the display device 100. In addition to the internal workings of the display device 100 as illustrated by the block diagram in FIG. 1, FIG. 2A illustrates that an outer body of the display device 100 may include a plurality of control buttons 104*a*, 104*b*, 104*c*. The control buttons 104*a*, 104*b*,104*c* may be embodied as physical buttons, or in some embodiments the control buttons 104*a*, 104*b*, 104*c* may be part of a user interface that is simply displayed as part of the main display 160. It should be understood that the present invention is not limited to the three control buttons 104*a*, 104*b*, 104*c* and may still be implemented with a fewer or greater number of control buttons.

The main display 160 is exposed on the front side of the display device, where objects displayed on the main display 160 may be viewed by a user. The main display 160 is also seen to have a width, W.

Figure 2B:
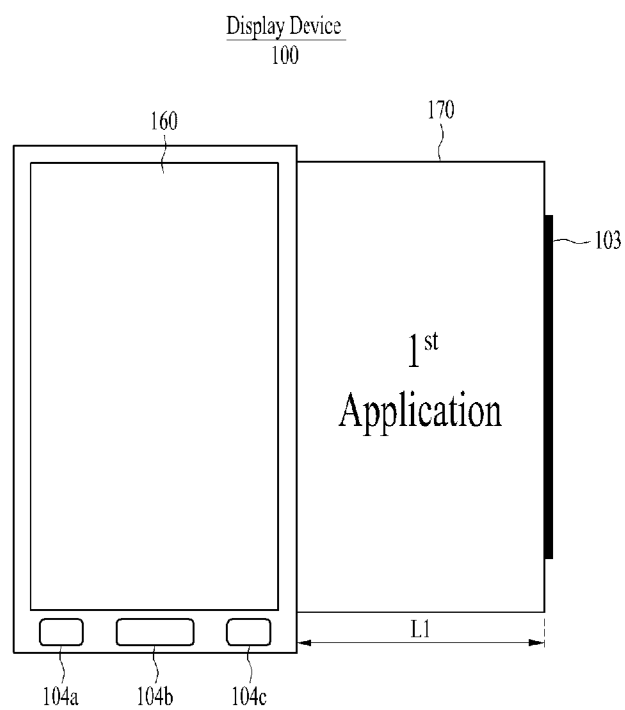
FIG. 2B illustrates a flexible display that is extended out to a first length from a display device, according to the present invention.
Figure 2C:
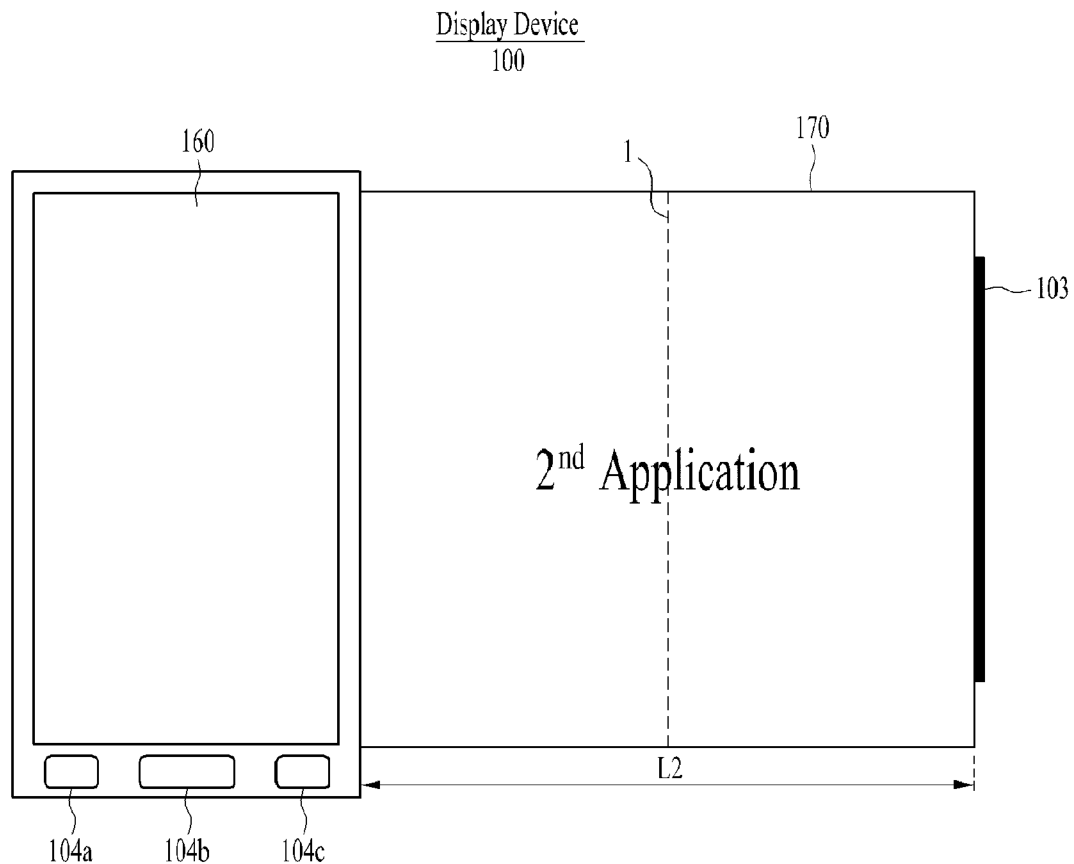
FIG. 2C illustrates a flexible display that is extended out to a second length from a display device, according to the present invention.
Figure 2D:
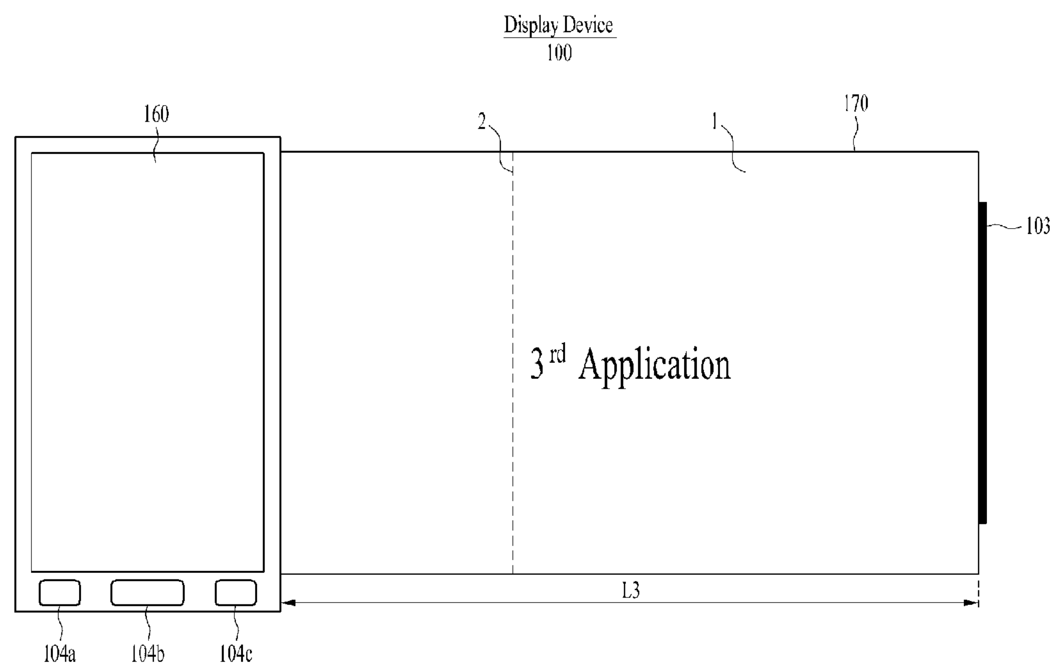
FIG. 2D illustrates a flexible display that is extended out to a third length from a display device, according to the present invention.

FIG. 2A also illustrates the display device including a handle 103 that is attached to the flexible display 170. The primary purpose of the handle 103 is to allow a user to easily pull out and push in the flexible display 170 from a stored location. The following FIGS. 2B-2D illustrates the flexible display 170 being exposed to a certain number of preset lengths (L1, L2, L3). Although the drawings specifically describe the flexible display 170 being exposed to the three preset lengths (L1, L2, L3), it is within the scope of the present invention to allow the flexible display 170 to be exposed to a smaller or greater number of preset lengths.

FIG. 2B illustrates the display device 100 where the flexible display 170 has been exposed to a first length, L1. After the measuring unit 140 has confirmed this by measuring the exposed portion of the flexible display 170 to be the first length, L1, such length measurement information may be transmitted to the system controller 110. Upon receiving the length measurement information from the measurement unit 140, the system controller 110 in turn may recognize that the flexible display 170 has been exposed to the first length, L1, and determine a display area on the flexible display 170 for displaying an application. The display area will have a first display size that is determined according to the measured first length, L1, of the exposed flexible display 170. Then based on the first display size of the display area on the flexible display 170, the system controller 110 may proceed to execute a first application accordingly. The executed first application is controlled to be displayed on the flexible display 170.

The first length, L1, may be equal to the width, W, of the main display 160, but it is also within the scope of the present invention for the first length L1 to be shorter or longer than the width, W, of the main display 160. The display device 100 may have sensing means (not expressly illustrated) that is able to detect when the flexible display 170 has been extended to the first length, L1, by detecting a first partition line 1 as illustrated in FIG. 2C. The first partition line may or may not be expressly visible on the flexible display 170.

According to a first embodiment of the present invention, the application that is executed and controlled to be displayed on the flexible display 170 when the display area on the flexible display 170 is determined to be the first size, need not specifically be related to an application that is currently being displayed on the main display 160.

The first application may be a music playing application, a remote control application, mouse pointer application, a mapping application, a web browsing application, a book reading application, a video player application or other similar application that is optimized to be displayed on a small sized display as when the display area on the flexible display 170 is determined to be the first display size.

FIG. 2C illustrates the flexible display 170 as being pulled out to have a second length, L2, of the flexible display 170 exposed and available for viewing. After the measuring unit 140 has confirmed this by measuring the exposed portion of the flexible display 170 to be the second length, L2, such length measurement information may be transmitted to the system controller 110. Upon receiving the length measurement information from the measurement unit 140, the system controller 110 in turn may recognize that the flexible display 170 has been exposed to the second length, L2, and determine a display area on the flexible display 170 for displaying an application. The display area will have a second display size that is determined according to the measured second length, L2, of the exposed flexible display 170. Then based on the second display size of the display area on the flexible display 170, the system controller 110 may proceed to execute a second application accordingly. The executed second application is controlled to be displayed on the flexible display 170.

The second length, L2, may be equal to twice the width, 2W, of the main display 160, but it is also within the scope of the present invention for the second length L2 to be shorter or longer than twice the width, 2W, of the main display 160. The display device 100 may have sensing means (not expressly illustrated) that is able to detect when the flexible display 170 has been extended to the second length, L2, by detecting a second partition line 2 as illustrated in FIG. 2D. The second partition line may or may not be expressly visible on the flexible display 170.

According to a first embodiment of the present invention, the application that is executed and controlled to be displayed on the flexible display 170 when the display area is determined to be the second display size, need not specifically be related to an application that is currently being displayed on the main display 160.

The second application may be a music playing application, a remote control application, mouse pointer application, a mapping application, a web browsing application, a book reading application, a video player application or other similar application that is optimized to be displayed on a medium sized display as when the display area on the flexible display 170 is determined to be the second display size.

FIG. 2D illustrates the flexible display 170 as being pulled out to have a third length, L3, of the flexible display 170 exposed and available for viewing. After the measuring unit 140 has confirmed this by measuring the exposed portion of the flexible display 170 to be the third length, L3, such length measurement information may be transmitted to the system controller 110. Upon receiving the length measurement information from the measurement unit 140, the system controller 110 in turn may recognize that the flexible display 170 has been exposed to the third length, L3, and determine a display area on the flexible display 170 for displaying an application. The display area will have a third display size that is determined according to the measured third length, L3, of the exposed flexible display 170. Then based on the third display size of the display area on the flexible display 170, the system controller 110 may proceed to execute a third application accordingly. The executed third application may then be controlled to be displayed on the flexible display 170.

The third length, L3, may be equal to three times the width, 3W, of the main display 160, but it is also within the scope of the present invention for the third length L3 to be shorter or greater than three times the width, 3W, of the main display 160. The display device 100 may have sensing means (not expressly illustrated) that is able to detect when the flexible display 170 has been extended to the third length, L3, by detecting a third partition line 1 (not expressly illustrated). The third partition line may or may not be expressly visible on the flexible display 170.

According to a first embodiment of the present invention, the application that is executed and controlled to be displayed on the flexible display 170 when the display area on the flexible display 170 is determined to be the third display size, need not specifically be related to an application that is currently being displayed on the main display 160.

The third application may be a music playing application, a remote control application, mouse pointer application, a mapping application, a web browsing application, a book reading application, a video player application or other similar application that is optimized to be displayed on a large sized display as when the display area on the flexible display 170 is determined to be the third size.

According to some embodiments, the application to be executed and displayed on the flexible display 170 for each determined display area's display size that is based on a measured preset length of the flexible display 170 (L1, L2, L3, etc. . . . ) may be described in a designation list stored on the storage unit 120. Such a designation list may be described by the table illustrated in FIG. 3A So the first application may have been stored in the designation list as being the application designated to be executed and displayed on the flexible display 170 when the flexible display 170 is pulled out to be exposed to the first length, L1, and therefore the display size of a display area on the flexible display 170 is determined to be the first display size. And the second application may have been stored in the designation list as being the application designated to be executed and displayed on the flexible display 170 when the flexible display 170 is pulled out to be exposed to the second length, L2, and therefore the display size of a display area on the flexible display 170 is determined to be the second display size. And the third application may have been stored in the designation list as being the application designated to be executed and displayed on the flexible display 170 when the flexible display 170 is pulled out to be exposed to the third length, L3, and therefore the display size of a display area on the flexible display 170 is determined to be the third display size.

The applications that are listed in the designation list may be predetermined by a manufacturer to be an optimal application to be executed and displayed on the flexible display 170 for each display size of a display area on the flexible display 170. The applications that are listed in the designation list may also be updated by a user at any time. An application may be determined to be optimal based on such factors as an available resolution of the exposed flexible display 170 within a determined display area, screen size of a determined display area or simply user preference.

According to some embodiments, the usage habits of a user may be stored as usage history information in the storage unit 120. The history information may track a frequency with which certain applications have been executed and displayed on the flexible display 170 for a given display size of a display area on the flexible display 170. Then an application that is found to have been previously executed and displayed with the highest frequency on the flexible display 170 for a given display size of a display area may be set to be the application that is executed and displayed the next time the display area on the flexible display 170 is set to the corresponding display area size. Such usage history information may be described by the table illustrated in FIG. 3B.

So according to these embodiments, a user's usage history information may have indicated that the first application is the application that was most frequently executed and displayed on the flexible display 170 when the flexible display 170 was pulled out to be exposed to the first length, L1, and therefore the display size of a display area on the flexible display 170 was set to the first display size. And a user's usage history information may have indicated that the second application is the application that was most frequently executed and displayed on the flexible display 170 when the flexible display 170 was pulled out to be exposed to the second length, L2, and therefore the display size of a display area on the flexible display 170 was set to the second display size. And a user's usage history information may have indicated that the third application is the application that was most frequently executed and displayed on the flexible display 170 when the flexible display 170 was pulled out to be exposed to the third length, L3, and therefore the display size of a display area on the flexible display 170 was set to the third display size.

For instance, if a user operates the display device 100 such that the history information reflects that a web browsing application has been executed and displayed on the flexible display 170 with the greatest frequency compared to other applications when the flexible display 170 has been pulled out to be exposed to the second length, L2, and the display size of a determined display area is set to the second size, then the next time the flexible display 170 is pulled out to the second length, L2, and the display area on the flexible display 170 is set to the second display size, the same web browsing application may be set to be executed and displayed on the flexible display 170.

FIGS. 4A to 4D illustrate the display device 100 of the present invention according to a second embodiment where an application that is set to be executed and displayed on the flexible display 170 shares a connection to a main application that is being executed and displayed on the main display 160. For exemplary purposes, the following description will be provided with reference to a profile information providing application being set as the main application that is displayed on the main display 160, however it is within the scope of the present invention to allow for other available applications to be set as the main application.

Figure 4A:
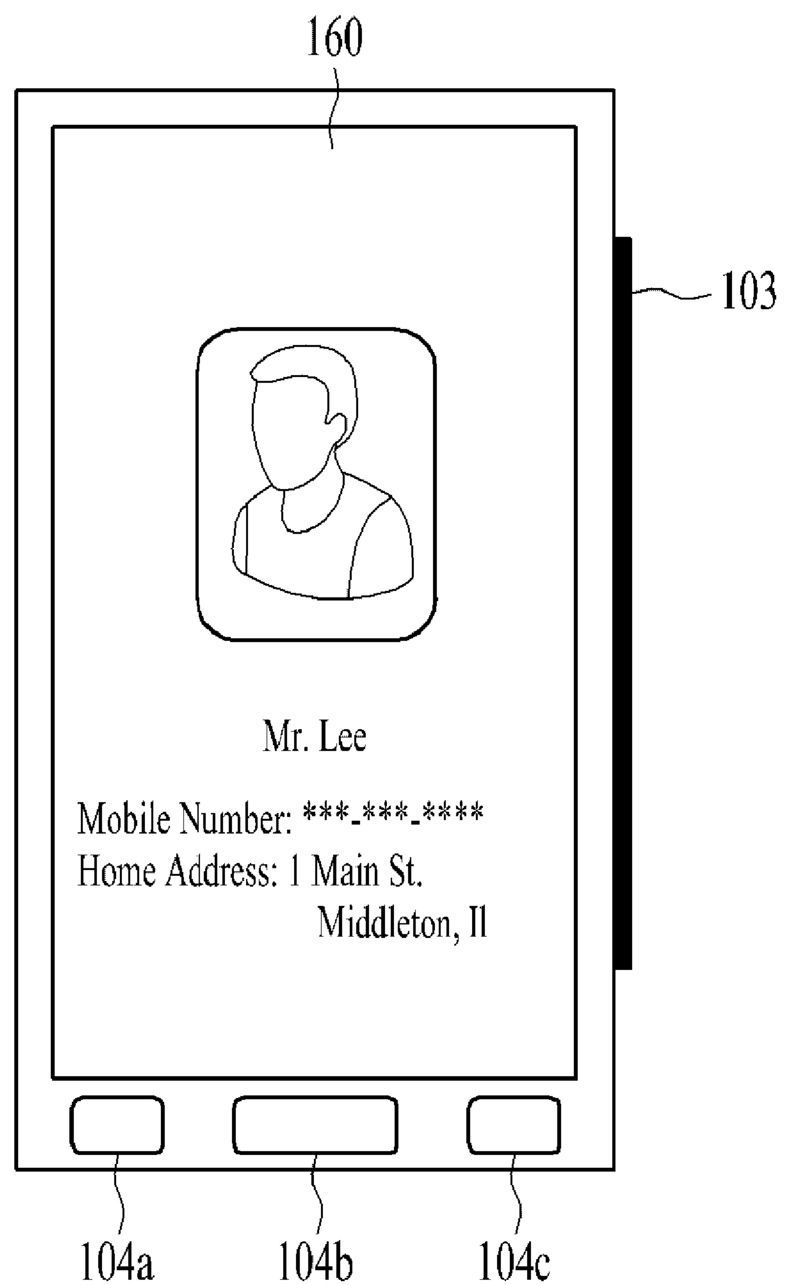
FIG. 4A illustrates a main application being displayed on a main display of a display device, according to some embodiments of the present invention.

FIG. 4A illustrates the display device 100, where a main application is being executed and displayed on the main display 160. In this instance the main application provides profile information on a person (e.g. Mr. Lee) that belongs to a contact list of a user of the display device. The main application is depicted as displaying a profile picture of Mr. Lee, mobile phone number of Mr. Lee and a home address for Mr. Lee. While the main application in FIG. 4A is depicted as being profile information application, other applications may also be utilized as the main application.

Figure 4B:
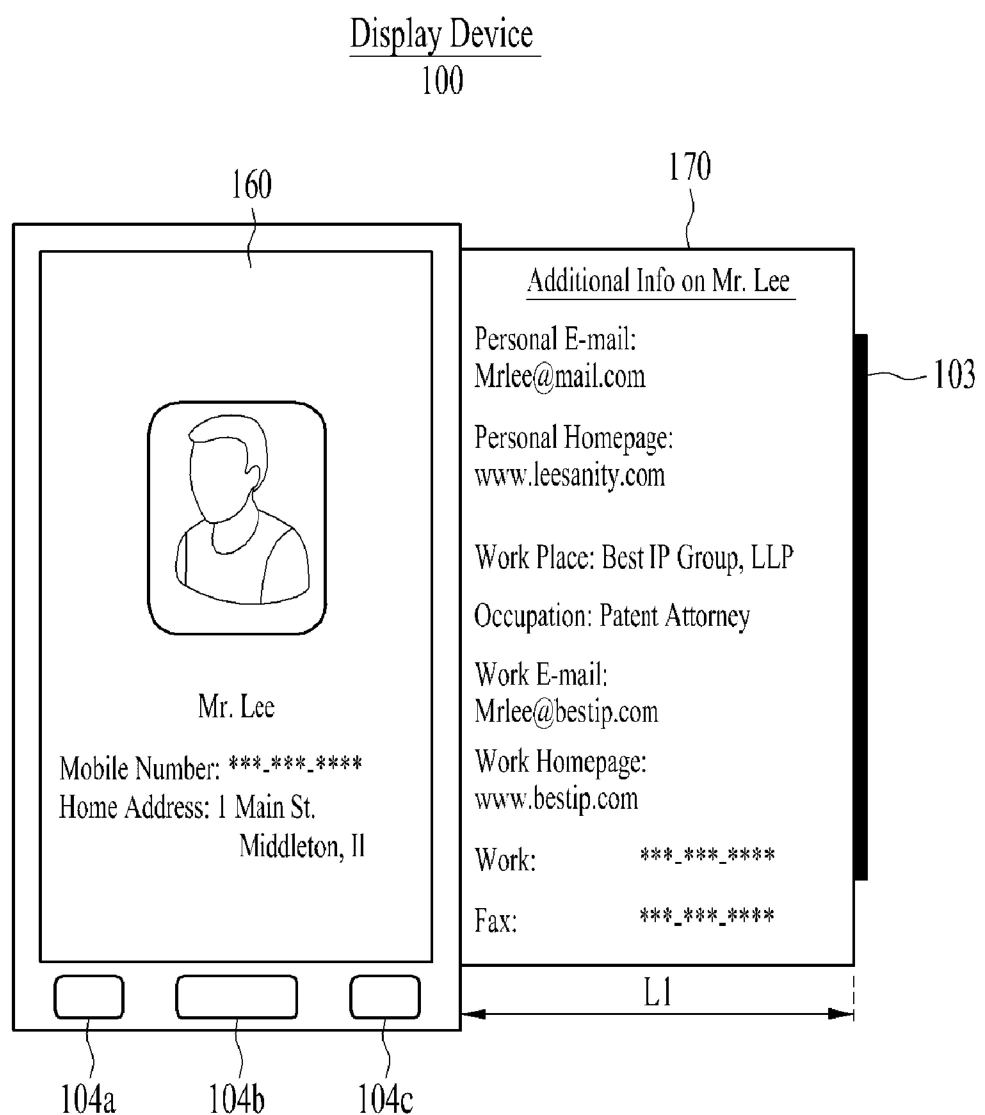
FIG. 4B illustrates a main application being displayed on a main display and a first supplemental application being displayed on a flexible display of a display device, according to some embodiments of the present invention.

In FIG. 4B, a first supplemental application is depicted as being executed and displayed on the flexible display 170 when the flexible display 170 has been pulled out to be exposed the first length, L1, and a display area on the flexible display 170 is set to a first display size. In the embodiment illustrated by FIG. 4B, the first supplemental application is identified on the flexible display 170 as "Additional Info on Mr. Lee". Thus the first supplemental application is related to the main application displayed on the main display 160 by providing additional profile information on the subject that is identified in the main application (i.e. Mr. Lee). The additional information provided by the first supplemental application is depicted as including personal email information, personal homepage information, work place information, occupational information, work email information, work homepage information, work phone number information and work fax number information. It should be noted that it is within the scope of the present invention to provide a lesser or greater amount of additional information in a corresponding first supplemental application. It should also be noted that although the first supplemental application has been depicted in the embodiment illustrated in FIG. 4B as an application for providing additional profile information, it is within the scope of the present invention to associate any number of other applications as the first supplemental application that are able to relate to the main application.

In FIG. 4C, a second supplemental application is depicted as being executed and displayed on the flexible display 170 when the flexible display 170 has been pulled out to be exposed the second length, L2, and a display area on the flexible display 170 is set to a second display size. In the embodiment illustrated by FIG. 4C, the second supplemental application is identified on the flexible display 170 as "Photos of Mr. Lee". Thus the second supplemental application is related to the main application displayed on the main display 160 by providing photos on the subject that is identified in the main application (i.e. photos of Mr. Lee) that are accessible by the display device 100. The photos provided by the second application may be accessed from the local storage unit 120 of the display device, or may be accessed from an external storage device via the communications unit 130. The photos located for the second supplemental application may be located by referencing a photo's tag information identifying the subject of the main application. It should be noted that although the second supplemental application has been depicted in the embodiment illustrated in FIG. 4C as a photo application, it is within the scope of the present invention to associate any number of other applications as the second supplemental application that are able to relate to the main application.

In FIG. 4D, a third supplemental application is depicted as being executed and displayed on the flexible display 170 when the flexible display 170 has been pulled out to be exposed the third length, L3, and a display area on the flexible display 170 is set to a third display size. In the embodiment illustrated by FIG. 4D, the third supplemental application is identified on the flexible display 170 as "Mapping Information". The third supplemental application provides an advanced mapping application that is optimized to locate a home address of the subject that is identified on the main application (i.e. home address of Mr. Lee). Thus the third supplemental application is related to the main application displayed on the main display 160 by referencing the home address information of the subject identified in the main application, and executing the third supplemental application to locate the home address and display the results on the flexible display 170. This is the scene depicted in FIG. 4D. It should be noted that although the third supplemental application has been depicted in the embodiment illustrated in FIG. 4D as a mapping application, it is within the scope of the present invention to associate any number of other applications as the third supplemental application that are able to relate to the main application.

As to the specific methods employed for determining a supplemental application to execute and display on the flexible display 170 that relates back to a main application being executed and displayed on the main display 160, in some embodiments the supplemental application may be described in a supplemental designation list stored on the storage unit 120. Such a supplemental designation list may be described by the table illustrated in FIG. 5A.

So according to the table illustrated in FIG. 5A, the first supplemental application may have been stored in the supplemental designation list as being the supplemental application designated to be executed and displayed on the flexible display 170 when the main application is the profile information application and the flexible display 170 is pulled out to be exposed to the first length, L1, so that a display area on the flexible display 170 is set to the first display size. And the second application may have been stored in the supplemental designation list as being the supplemental application designated to be executed and displayed on the flexible display 170 when the main application is the profile information application and the flexible display 170 is pulled out to be exposed to the second length, L2, so that the display area on the flexible display 170 is set to the second display size. And the third supplemental application may have been stored in the supplemental designation list as being the supplemental application designated to be executed and displayed on the flexible display 170 when the main application is the profile information application and the flexible display 170 is pulled out to be exposed to the third length, L3, so that a display area on the flexible display 170 is set to the third display size.

The supplemental applications that are listed in such a supplemental designation list may be predetermined by a manufacturer to be an optimal application to be executed and displayed on the flexible display 170 for a given main application and each given display area size on the flexible display 170. The applications that are listed in the designation list may also be updated by a user at any time. An application may be determined to be optimal based on such factors as resolution of the display area size on the flexible display 170, display area size on the exposed flexible display 170 or simply user preference.

As to another specific method employed for determining a supplemental application to execute and display on the flexible display 170 that relates back to a main application being executed and displayed on the main display 160, in some embodiments the supplemental application to be executed and displayed on the flexible display 170 for a given main application and a given display area size on the flexible display 170 may be determined according to usage history information describing a user's display device 100 usage habits. Such usage history information may be stored in the storage unit 120.

The history information may track a frequency with which a given supplemental application has been executed and displayed on the flexible display 170 to supplement a given main application for each display area size on the flexible display 170. Then a supplemental application that is found to have been previously executed and displayed with the highest frequency on the flexible display 170 for a given main application and for a given display area size on the flexible display 170 may be set to be the supplemental application that is executed and displayed on the flexible display 170 the next time the flexible display 170 is pulled out to be exposed to the preset length that results in the given display area size on the flexible display 170. Such usage history information may be described by the table illustrated in FIG. 5B.

For instance, according to the table illustrated by FIG. 5B a user's usage history information may indicate that the first supplemental application is the supplemental application that was most frequently executed and displayed on the flexible display 170 when the main application was the profile information application and the flexible display 170 was pulled out to be exposed to the first length, L1, so that the display area on the flexible display 170 is set to the first display size. And the usage history information may indicate that the second supplemental application is the supplemental application that was most frequently executed and displayed on the flexible display 170 when the main application was the profile information application and the flexible display 170 was pulled out to be exposed to the second length, L2, so that the display area on the flexible display 170 is set to the second display size. And the usage history information may indicate that the third supplemental application is the supplemental application that was most frequently executed and displayed on the flexible display 170 when the main application was the profile information application and the flexible display 170 was pulled out to be exposed to the third length, L3, so that the display area on the flexible display 170 is set to the third display size.

Figure 6A:
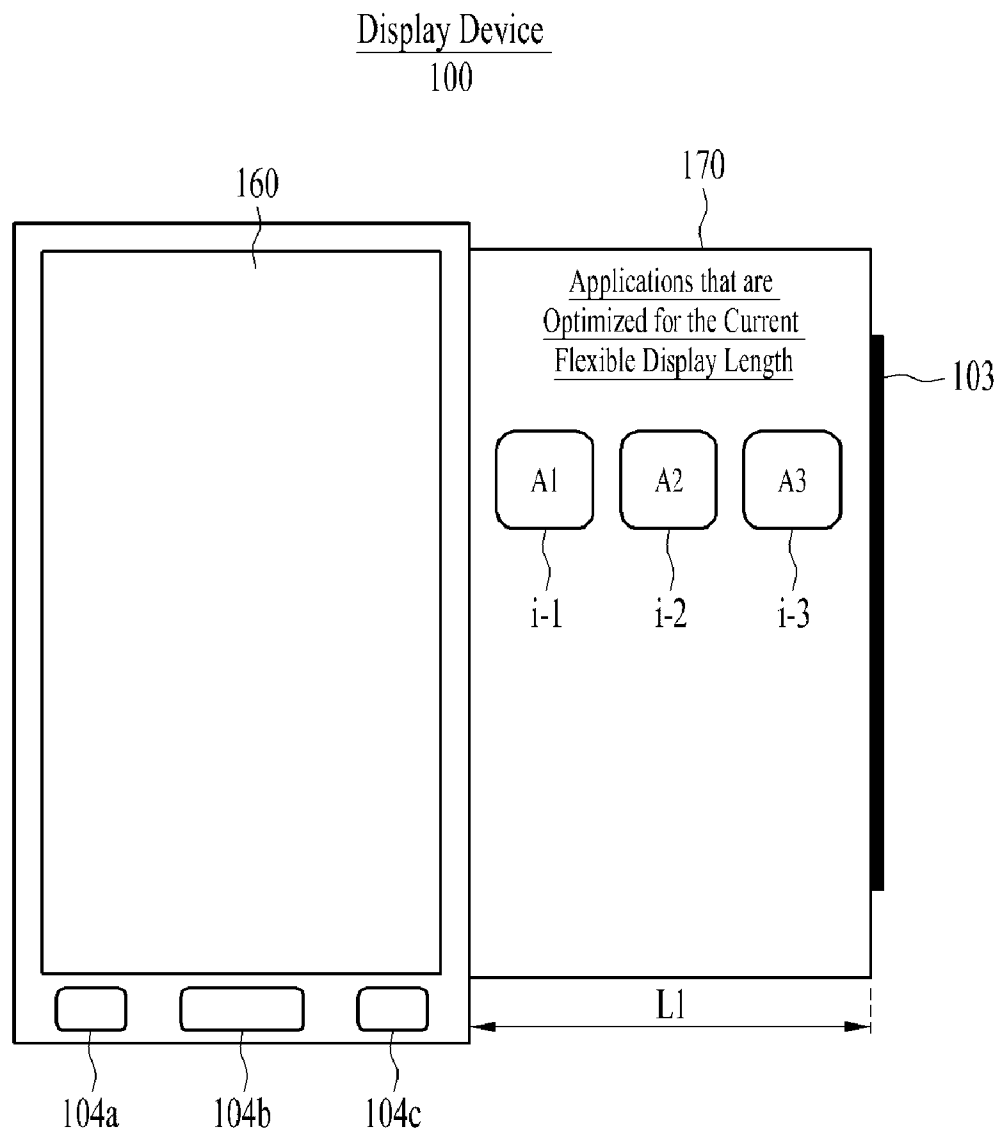
FIG. 6A illustrates a number of indicators representing respective applications being displayed on a flexible display when the flexible display is extended out to a first length, according to some embodiments of the present invention.
Figure 6B:
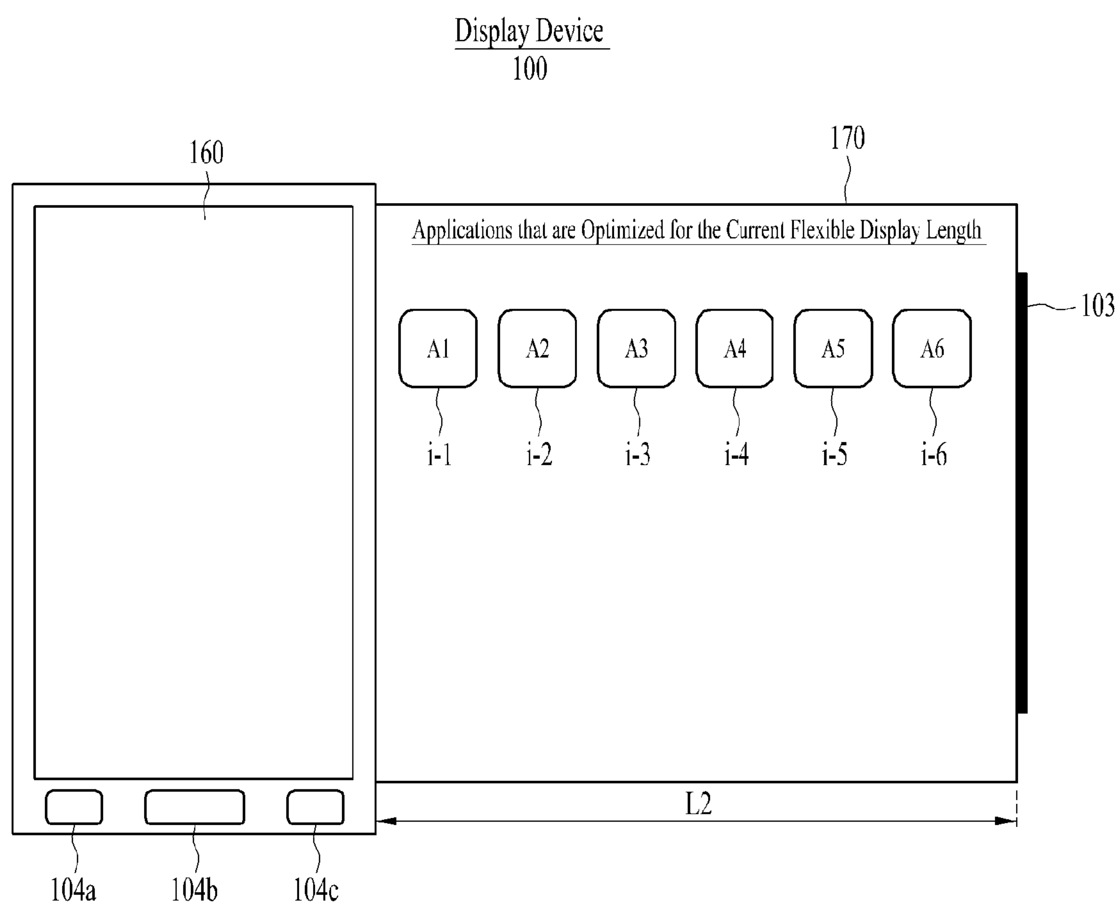
FIG. 6B illustrates a number of indicators representing respective applications being displayed on a flexible display when the flexible display is extended out to a second length, according to some embodiments of the present invention.
Figure 6C:
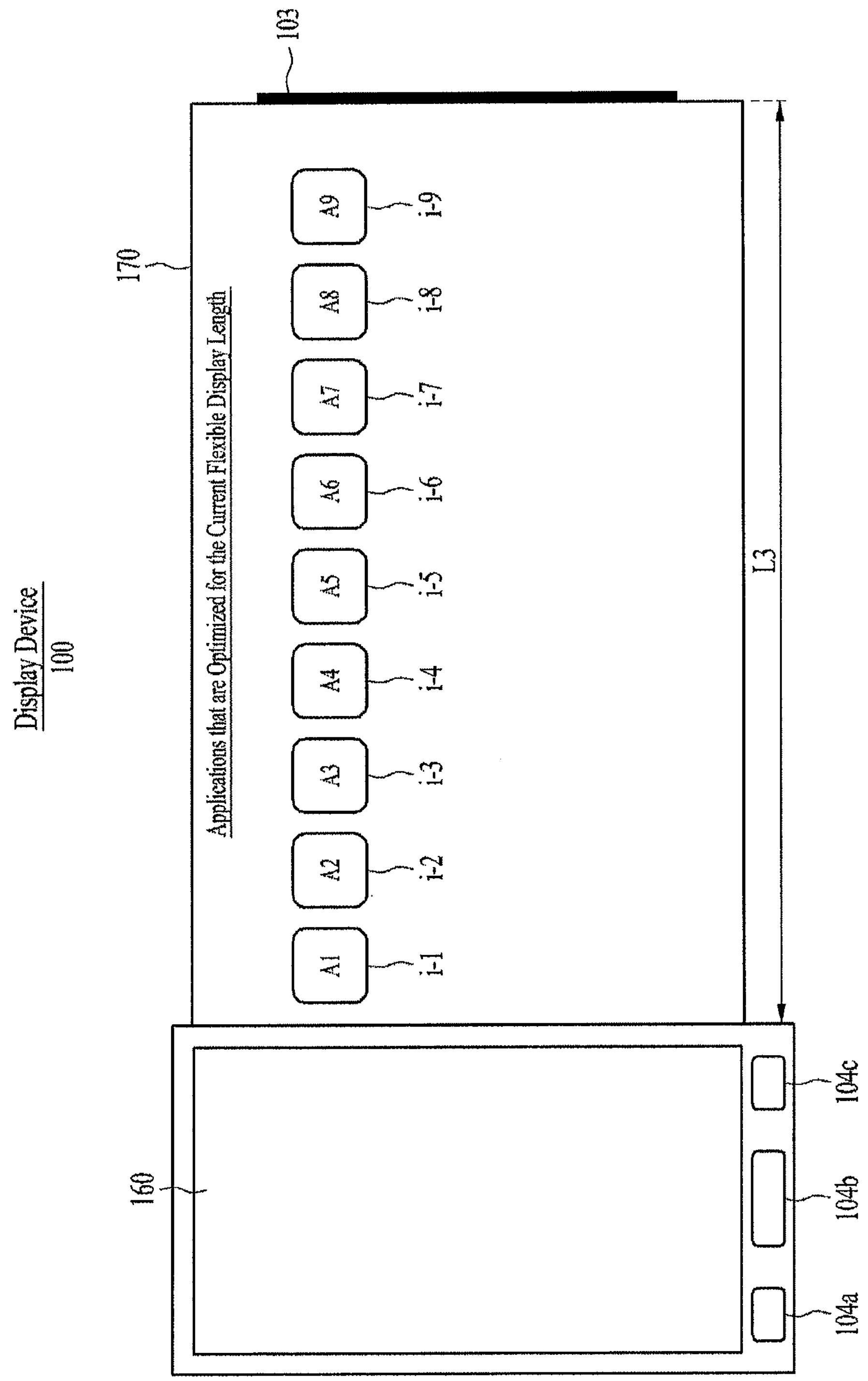
FIG. 6C illustrates a number of indicators representing respective applications being displayed on a flexible display when the flexible display is extended out to a third length, according to some embodiments of the present invention.

FIGS. 6A-6C illustrate a feature of the present invention for providing a visual indication that identifies applications that are available for execution and display on the flexible display 170 for each display area size on the flexible display 170 as determined by a length of the flexible display 170 that is extended from a stored location of the display device.

FIG. 6A illustrates the scene when the flexible display 170 has been pulled out to be exposed to the first length, L1, so that a display area on the flexible display is set to a first display size. Then for the first display size of the display area on the flexible display 170, each of the identifiers i-1, i-2, i-3 that are displayed on the flexible display 170 represent an application that has been designated to be available for executing and displaying on the flexible display 170 when the display area is the first display size. Although three unique applications have been expressly illustrated in FIG. 6A as being available for execution and display on the flexible display 170 at the first display size of the display area, it is within the scope of the present invention to allow a fewer or greater of applications to be made available in such instances. Thus a fewer, or greater, number of identifiers may be displayed on the flexible display 170.

The identifiers i-1, i-2, i-3 are displayed on the flexible display 170 to provide a user with a visual indication as to the applications that are available for execution and display on the flexible display 170 for when the display area is the first display size, in accordance to the measured first length, L1, of the exposed flexible display 170. The user may then select one of the identifiers i-1, i-2, i-3 to initiate the execution and display of a corresponding application on the flexible display 170. A selection of one of the identifiers i-1, i-2, i-3 may be accomplished by a user touch input contacting an area on the flexible display 170 that overlaps with the identifier that is intended to be selected. Once an identifier is selected, the corresponding application will be executed and displayed on the flexible display 170.

For exemplary purposes FIG. 6A illustrates three identifiers i-1, i-2, i-3 being displayed on the flexible display 170, therefore correspondingly identifying the three applications A1, A2, A3 that are available to be executed and displayed on the flexible display 170 when the flexible display 170 is pulled out to be exposed to the first length, L1, so that the display area on the flexible display 170 is set to the first display size.

For exemplary purposes FIG. 6B illustrates six identifiers i-1, i-2, i-3, i-4, i-5, i-6 being displayed on the flexible display 170, therefore correspondingly identifying the six applications A1, A2, A3, A4, A5, A6 that are available to be executed and displayed on the flexible display 170 when the flexible display 170 is pulled out to be exposed to the second length, L2, so that the display area on the flexible display 170 is set to the second display size.

For exemplary purposes FIG. 6C illustrates nine identifiers i-1, i-2, i-3, i-4, i-5, i-6, i-7, i-8, i-9 being displayed on the flexible display 170, therefore correspondingly identifying the nine applications A1, A2, A3, A4, A5, A6, A7, A8, A9 that are available to be executed and displayed on the flexible display 170 when the flexible display 170 is pulled out to be exposed to the third length, L3, so that the display area on the flexible display 170 is set to the third display size.

The number and combinations of applications illustrated in FIGS. 6A-6C are made for exemplary purposes, and thus a fewer or greater number of applications may be made available for execution and display on the flexible display 170 for each given display area size on the flexible display 170.

Figure 7:
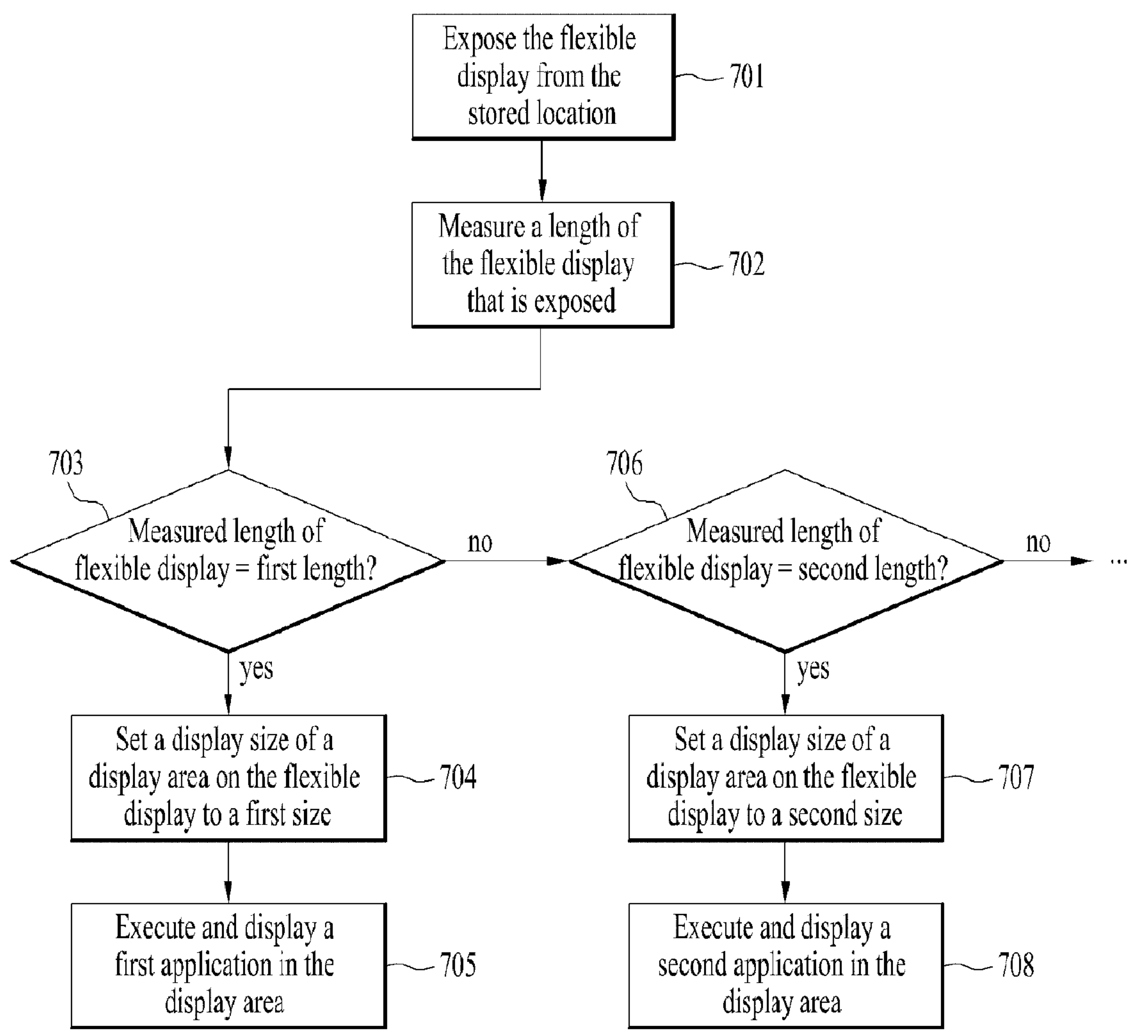
FIG. 7 illustrates a flow chart describing a method for determining an application to execute and display on a flexible display of a display device, according to some embodiments of the present invention.

FIG. 7 illustrates a flow chart describing a process for determining an application to be executed and displayed on a flexible display as the flexible display is extended out from a stored location of the display device, according to some embodiments of the present invention.

In step 701*a* user begins to extend a flexible display from a stored location within a display device of the present invention. Then as the flexible display is extended out from the stored location, the measuring unit 140 may be configured to be measuring a length of the flexible display that has been extended out from the stored location and is available for viewing by a user, as described by step 702.

Then a first determination is made at step 703 as to whether the measured length of the flexible display that is exposed is equal to a first length, where the first length may be a preset length. If the measured length of the flexible display is found to be equal to the first length, then the process proceeds to step 704 where a display area on the flexible display is set to be a first display size. Then a first application is controlled to be displayed within the display area on the flexible display, as described by step 705.

However, if at step 703 it is found that the measured length of the flexible display that is exposed is not equal to the first length, then the process may proceed to step 706 where a determination is processed to determine whether the measured length of the flexible display is equal to a second length, where the second length may be a preset length. If the measured length of the flexible display is found to be equal to the second length, then the process proceeds to step 707 where a display area on the flexible display is set to a second display size. Then a second application is controlled to be displayed within the display area on the flexible display, as described by step 708.

If however at step 706 it is found that the measured length of the flexible display that is exposed is not equal to the second length, then the process may proceed to additional steps to determine whether the measured length of the flexible display matches up to any other preset length of the flexible display. This may continue for each preset length of the flexible display that is stored in the display device of the present invention.

Figure 8:
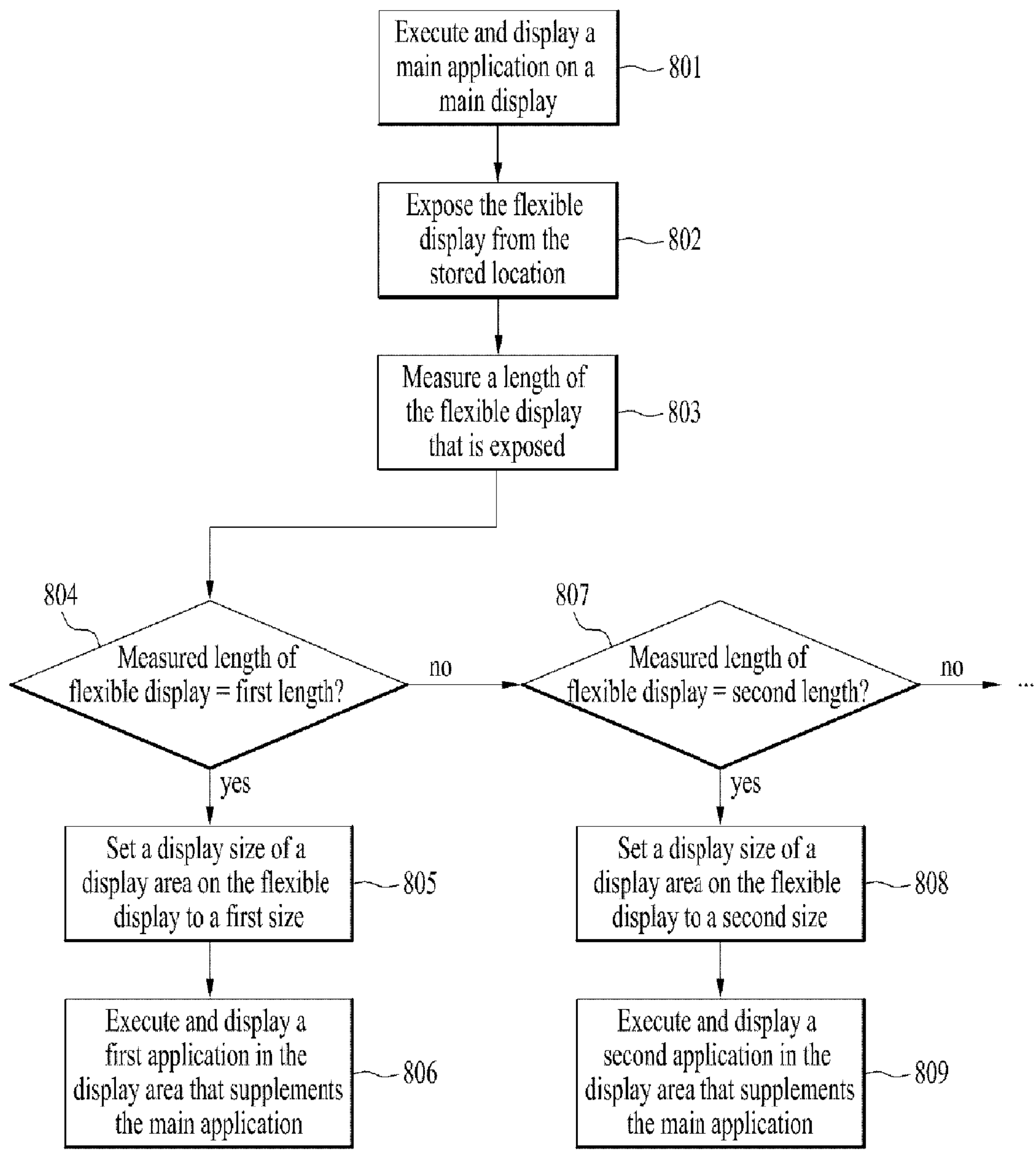
FIG. 8 illustrates a flow chart describing a method for determining an application to execute and display on a flexible display of a display device, according to some embodiments of the present invention.

FIG. 8 illustrates a flow chart describing a process for determining a supplemental application to be executed and displayed on the flexible display 170 as the flexible display 170 is extended out from a stored location of the display device where the supplemental application is related to a main application that is being displayed on a main display, according to some embodiments of the present invention.

In the first step 801, a main application is seen to be executed and displayed on a main display of a display device of the present invention.

In step 802 a user begins to extend a flexible display from a stored location within the display device. Then as the flexible display is being extending out from the stored location, the measuring unit 140 may be configured to be measuring a length of the flexible display that has been extended out from the stored location and is available for viewing by a user, as described by step 803.

Then a first determination is made at step 804 as to whether the measured length of the flexible display that is exposed is equal to a first length, where the first length may be a preset length. If the measured length of the flexible display is found to be equal to the first length, then the process proceeds to step 805 where a display area on the flexible display is set to be a first display size. Then a first supplemental application is controlled to be displayed within the display area on the flexible display, as described by step 806, where the first supplemental application supplements the main application.

However, if at step 804 it is found that the measured length of the flexible display that is exposed is not equal to the first length, then the process may proceed to step 807 where a determination is processed to determine whether the measured length of the flexible display is equal to a second length, where the second length may be a preset length. If the measured length of the flexible display is found to be equal to the second length at step 807, then the process proceeds to step 808 where a display area on the flexible display is set to a second display size. Then a second supplemental application is controlled to be displayed within the display area on the flexible display, as described by step 809.

If however at step 807 it is found that the measured length of the flexible display that is exposed is not equal to the second length, then the process may proceed to additional steps to determine whether the measured length of the flexible display matches up to any other preset length of the flexible display. This may continue for each preset length of the flexible display that is stored in the display device of the present invention.

Similarly, the process illustrated by the flow chart of FIG. 8 may be repeated for each main application that is executed and displayed on a main display.

Figure 9:
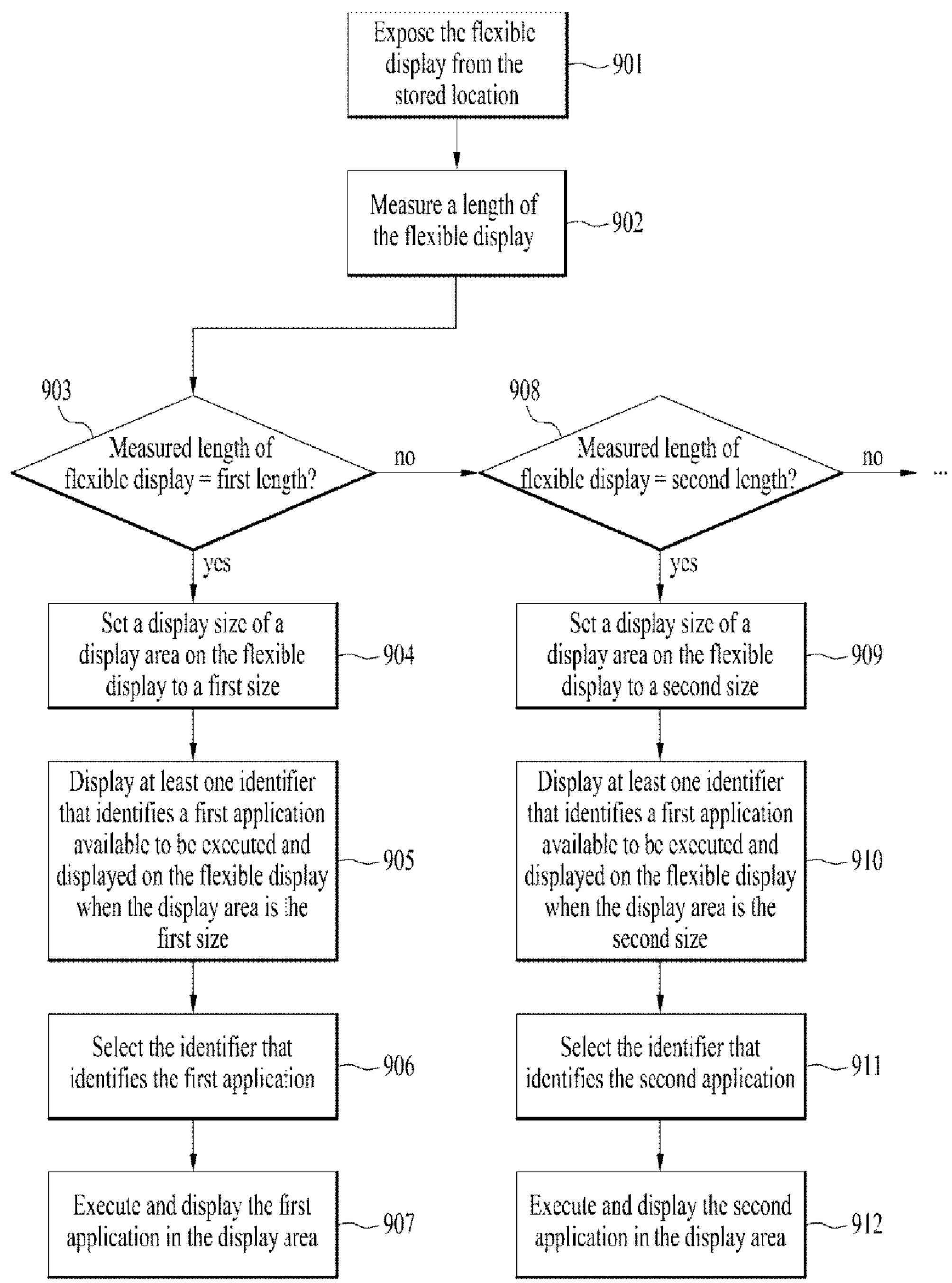
FIG. 9 illustrates a flow chart describing a method for determining an application to execute and display on a flexible display of a display device, according to some embodiments of the present invention.

FIG. 9 illustrates a flow chart describing a process for displaying indicators on a flexible display of the present invention prior to actually executing and displaying an application on the flexible display, where the indicators represent applications that are made available for executing and displaying on a display area of the flexible display for a current display size of the display area.

In step 901 a user begins to extend a flexible display from a stored location within a display device of the present invention. Then as the flexible display is extended out from the stored location, the measuring unit 140 may be configured to be measuring a length of the flexible display that has been extended out from the stored location and is available for viewing by a user, as described by step 902.

Then a first determination is made at step 903 as to whether the measured length of the flexible display that is exposed is equal to a first length, where the first length may be a preset length. If the measured length of the flexible display is found to be equal to the first length, then the process proceeds to step 904 where a display area on the flexible display is set to be a first display size.

Then at step 905, at least one identifier is displayed on the flexible display, where the at least one identifier identifies at least a first application that is currently available to be executed and displayed on the flexible display when the display area is the current first display size. Each identifier that is displayed on the flexible display serves to identify a predetermined application that is predetermined to be available for display on the flexible display when the display area on the flexible display is the first display size.

Then the user may select an identifier that is displayed on the flexible display at step 906, and then the corresponding first application may be executed and displayed in the display area as described by step 907.

However, if at step 903 it is found that the measured length of the flexible display that is exposed is not equal to the first length, then the process may proceed to step 908 where a determination is processed to determine whether the measured length of the flexible display is equal to a second length, where the second length may be a preset length. If the measured length of the flexible display is found to be equal to the second length, then the process proceeds to step 909 where a display area on the flexible display is set to a second display size.

Then at step 910, at least one identifier is displayed on the flexible display, where the at least one identifier identifies at least a second application that is currently available to be executed and displayed on the flexible display when the display area is the current second display size. Each identifier that is displayed on the flexible display serves to identify a predetermined application that is predetermined to be available for display on the flexible display when the display area on the flexible display is the second display size.

Then the user may select an identifier that is displayed on the flexible display at step 911, and then the corresponding second application may be executed and displayed in the display area as described by step 912.

However if at step 908 it is found that the measured length of the flexible display that is exposed is not equal to the second length, then the process may proceed to additional steps to determine whether the measured length of the flexible display matches up to any other preset length of the flexible display. This may continue for each preset length of the flexible display that is stored in the display device of the present invention.

INDUSTRIAL APPLICABILITY

The present invention is applicable in display devices that employ a flexible display.

The invention claimed is:

1. A method of controlling a flexible display of a display device, the method comprising:

displaying a main application on a main display;

exposing the flexible display from the display device;

displaying a first application in the first-sized flexible display when a display size of the exposed flexible display is a first size;

switching from the first application to a second application when the display size of the exposed flexible display is changed from the first size to a second size;

displaying the second application in the second-sized flexible display;

displaying at least one identifier identifying an application that is designated to be executed and displayed on the flexible display when the display size of the flexible display is the first size; and selecting the identifier, wherein the selected identifier identifies the first application, wherein the first application provides first information and the second application provides second information, and the first information and the second information are associated with information of the main application respectively, wherein the first information and the second information are different from each other, wherein the first information and second information are not a continuation of information provided in the main application displayed on the main display, and wherein the first application and the second application are determined to be optimal based on at least one of an available resolution of the exposed flexible display within a determined display area and screen size of a determined display area.

2. The method of claim 1, further comprising:

storing, in a storage unit, a first list of applications that are designated to be executed and displayed on the flexible display when the display size of the flexible display is the first size, wherein the first application is included in the first list.

3. The method of claim 1, further comprising:

recording, in a storage unit, history information identifying the frequency with which applications are executed and displayed on the flexible display when the display size of the flexible display is the first size; and referencing the history information, and executing and displaying an application on the flexible display that has been executed and displayed on the flexible display with the highest frequency when the display size of the flexible display is the first size, wherein the first application is the application that has been executed and displayed on the flexible display with the highest frequency when the display size of the flexible display is the first size.

4. The method of claim 1, wherein the main application provides profile information of a person on a contact list stored in a storage unit, and the first application displays additional information on the person on the contact list.

5. The method of claim 1, further comprising:

returning the flexible display into the display device; and executing the first application and displaying the first application on the flexible display when the display size of the flexible display is back to the first size.

6. The method of claim 1, wherein the second application is one of a music playing application, a remote control application, mapping application, a web browsing application, a book reading application and a video player application.

7. The method of claim 1, further comprising:

continuing to expose the flexible display from the display device; and executing a third application and displaying the third application on the flexible display when the display size of the flexible display is third size.

8. The method of claim 1, wherein when the first application is switched to the second application, display attributes of the main application are maintained.

9. A display device, the display device comprising:

a main display configured to display a main application;

a flexible display configured to be exposed from the display device; and a system controller configured to display a first application in the first-sized flexible display when a display size of the exposed flexible display is a first size, wherein the system controller is configured to switch from the first application to a second application and display the second application which is different from the first application in the second-sized flexible display when the display size of the exposed flexible display is changed from the first size to a second size, wherein the first application provides first information and the second application provides second information, and the first information and the second information are associated with information of the main application respectively, wherein the first information and the second information are different from each other, wherein the first information and second information are not a continuation of information provided in the main application displayed on the main display, wherein the first application and the second application are determined to be optimal based on at least one of an available resolution of the exposed flexible display within a determined display area and screen size of a determined display area, wherein the flexible display is further configured to display at least one identifier identifying an application that is designated to be executed and displayed on the flexible display when the display size of the flexible display is the first size, and the system controller is configured to recognize a selection of the identifier displayed on the flexible display, and wherein the selected identifier identifies the first application.

10. The display device of claim 9, further comprising:

a storage unit configured to store a first list of applications that are designated to be executed and displayed on the flexible display when the display size of the flexible display is the first size, wherein the first application is included in the first list.

11. The display device of claim 9, further comprising:

a storage unit configured to record history information identifying the frequency with which applications are executed and displayed on the flexible display when the display size of the flexible display is the first size, and the system controller is further configured to reference the history information, and execute and control the display of an application on the flexible display that has been executed and displayed on the flexible display with the highest frequency when the display size of the flexible display is the first size, wherein the first application is the application that has been executed and displayed on the flexible display with the highest frequency when the display size of the flexible display is the first size.

12. The display device of claim 9, wherein the main application provides profile information of a person on a contact list stored in a storage unit, and the first application displays additional information on the person on the contact list.

13. The display device of claim 9, wherein the system controller is further configured to execute and control the display of the first application on the flexible display when the display size of the flexible display is back to the first size.

14. The display device of claim 9, wherein the second application is one of a music playing application, a remote control application mapping application, a web browsing application, a book reading application and a video player application.

15. The display device of claim 9, wherein the system controller is further configured to execute and control a display of a third application on the flexible display when the display size of the flexible display is the third size.

16. The display device of claim 9, wherein when the first application is switched to the second application, display attributes of the main application are maintained.

* * * * *